United States Patent
Hall

(10) Patent No.: US 6,252,565 B1
(45) Date of Patent: Jun. 26, 2001

(54) ELLIPTICAL CAVITY OPTICAL RETINAL DISPLAY

(75) Inventor: John M. Hall, Alexandria, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/182,458

(22) Filed: Oct. 30, 1998

(51) Int. Cl.[7] .................................................. G09G 5/00
(52) U.S. Cl. ................... 345/8; 345/7; 359/630; 359/631
(58) Field of Search ........................... 345/8, 7; 359/630, 359/631, 633, 638, 632

(56) References Cited

U.S. PATENT DOCUMENTS

| | | | |
|---|---|---|---|
| 5,355,181 | * 10/1994 | Ashizaki et al. | 348/744 |
| 5,369,415 | * 11/1994 | Richard et al. | 345/6 |
| 5,384,654 | * 1/1995 | Iba | 359/354 |
| 5,659,327 | * 8/1997 | Furness, III et al. | 345/8 |
| 5,867,134 | * 2/1999 | Alvelda et al. | 345/8 |
| 6,046,857 | * 4/2000 | Morishima | 359/630 |

OTHER PUBLICATIONS

IBM Technical Disclosure Bulletin, vol. 26, No. 9, Feb. 1984, pp. 4811–4812.*
IBM Technical Disclosure Bulletin, vol. 15, No. 4, Sep. 1972, pp. 1399–1400.*

* cited by examiner

Primary Examiner—Richard Hjerpe
Assistant Examiner—Alexander Eisen
(74) Attorney, Agent, or Firm—Milton W. Lee; John E. Holford; Alain L. Bashore

(57) ABSTRACT

An opto-mechanical configuration for direct laser scanned retinal imaging is described. The concept uses simple geometric properties of an ellipse in a reflective optical delivery system which allows a small scanned laser beam to create a two dimensional video image directly on the retina of the human eye. The system is best suited for use in head-mounted display applications where light weight is a priority.

20 Claims, 4 Drawing Sheets

ELLIPTICAL CAVITY OPTICAL RETINAL DISPLAY

BACKGROUND OF THE INVENTION

1. Field of the Invention

The present invention generally relates to video displays wherein electronic video signals in standard TV format are converted into visible images for viewing by human eyes.

2. Description of Prior Art

The information gathered by state of the art sensors such as video cameras, near infra-red cameras, light intensification devices and far-infrared systems like the Forward Looking Infra-Red detector (FLIR) must be presented to the user by means of visible display. A particularly convenient holder for these displays is the head mounted type, resembling ordinary reading glasses or goggles; that leave the user's head, hands and in some cases his eyes free for other tasks. Conventional displays, whether Cathode Ray Tube (CRT), Flat Panel (including Liquid Crystal Displays, Light Emitting Diodes, etc.) or laser projectors, all produce real images on a screen which must be viewed either directly by the eye (such as the case in viewing a conventional CRT computer monitor) or through some form of magnifying eyepiece lens (such as the case of viewing a miniature video recorder display). This arrangement requires considerable space, which is at a premium in head mounted displays.

SUMMARY OF THE INVENTION

According to the invention, space is conserved for head-mounted mounted display applications by using a new concept of direct retinal imaging for relaying video signal information to a human observer. Retinal imaging is distinguished from the above mentioned conventional display technology in that the only real video image is the one formed on the retina itself, e.g., there is no intermediate real image. This is achieved by combining optical intensity modulation and a serial scanning technique which can scan a single laser beam to create a desired video raster image. The laser beam is scanned directly into the pupil of the observer's eye, and there is no other intermediate viewable image. The difficulty in this approach is the design of an optical delivery system which is consistent with the available methods of scanning and the requirements for total field of view and eye relief distance, all in a lightweight package.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

One embodiment of a display using the concept of direct retinal imaging for relaying video signal information to a human observer is disclosed in applicant's copending application Ser. No. 09/154,572 (NVL-3199), pending. That embodiment uses two, preferably, separate adjustably spaced parabolic light reflectors. The current embodiment uses a single elliptical light reflector. This reflector is supported by a portion of a shell with an inside surface generated by rotating an ellipse about its major axis. The shell may be opaque to improve light contrast, but a transparent shell permits a bright image to be projected on an ambient background, as will be shown.

Figure 1:
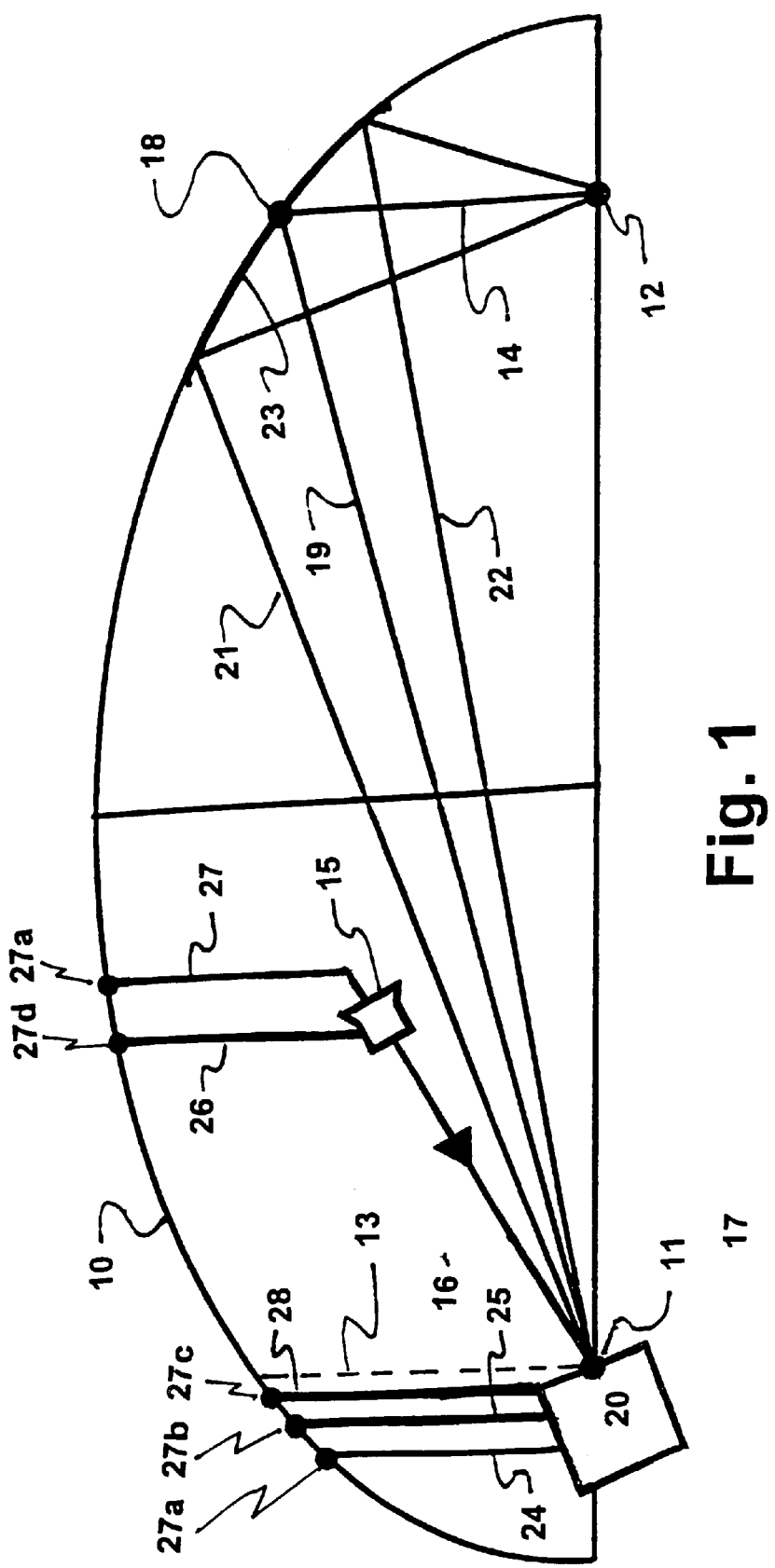
FIG. 1 shows a viewing module with half an ellipsoidal shell, a laser device, a scan mirror and a mirrored inner surface.

Referring specifically to FIG. 1 of the drawings a viewer module is shown that uses a shell portion 10 substantially equal to half the shell bisected by a cleaving plane through the major axis. The primary and secondary foci 11 and 12, respectively, are shown on this major axis. To establish an optical axis a reference plane is also passed through the major axis preferably normal to the center plane. The reference plane contains two straight lines that define primary and secondary normals 13 and 14 to the major axis, through the respective foci. A laser device 15 is preferably mounted on the inside surface of the shell, for example a diode laser emitting a narrow main beam of visible red light 16. This main beam is centered in the reference plane between the normals. This main beam has a cross section small enough to represent a pixel in the final image projected on the retina of the users eye and is directed to the primary focal point. A planar scan mirror 17 is centered on the primary focal point and initially oriented to reflect the main beam to a raster point 18 at the intersection of the secondary normal and the inner shell surface, as indicated by a central ray 19. A scan motor 20, such as a dual axis piezo-electric motor, is attached to the mirror to rotate it about normal x and y axes in the mirror surface, the y-axis being in the reference plane. The x-scan is many times the y-scan as in conventional TV to produce a rectangular raster. As the mirror scans the main beam, the latter illuminates a distorted raster area around the raster point, as partially indicated by extreme rays 21 and 22. This area supports a mirror coating 23 which may be a material selected from a group including; aluminum, silver, chromium, gold, as well as, layers of multiple quarter- wavelength thickness composed of optically transparent materials with varying indices of refraction or other light reflecting materials. The latter material can be deigned to reflect a single color or just a few, while remaining transparent for simultaneous direct viewing of other colors in ambient backgrounds. The central ray is reflected along the secondary normal while the extreme rays 21 and 22, as well as all other image rays are reflected to the secondary focal point. If the eye pupil of an observer is placed at the secondary focal point an image will be formed on the observer's retina. Overall package size and parameters such as eye relief distance may be accommodated by simply scaling all linear dimensions of the system, or, if new angular relationships are desired, this is accomplished by simply varying the eccentricity "e" of the ellipse.

The supports 24 and 25 for the laser device and similar supports 26 and 27 for the scan motor may also be or enclose electrical leads for modulation and synchronization signals. Ideally these supports are kept as short as possible, preferably by mounting at least the laser device directly on the shell. Electrodes 27b and 27c provide x and y inputs for the mirror motor and electrode 27a is its common return.

Electrode 27*d* provides amplitude modulation for the laser and electrode 27*a* is also the laser's common return, i.e. by directly electrically connecting all common returns. The laser device might also be the end of an optical waveguide fiber that terminates at a laser outside of the shell.

Figure 2:
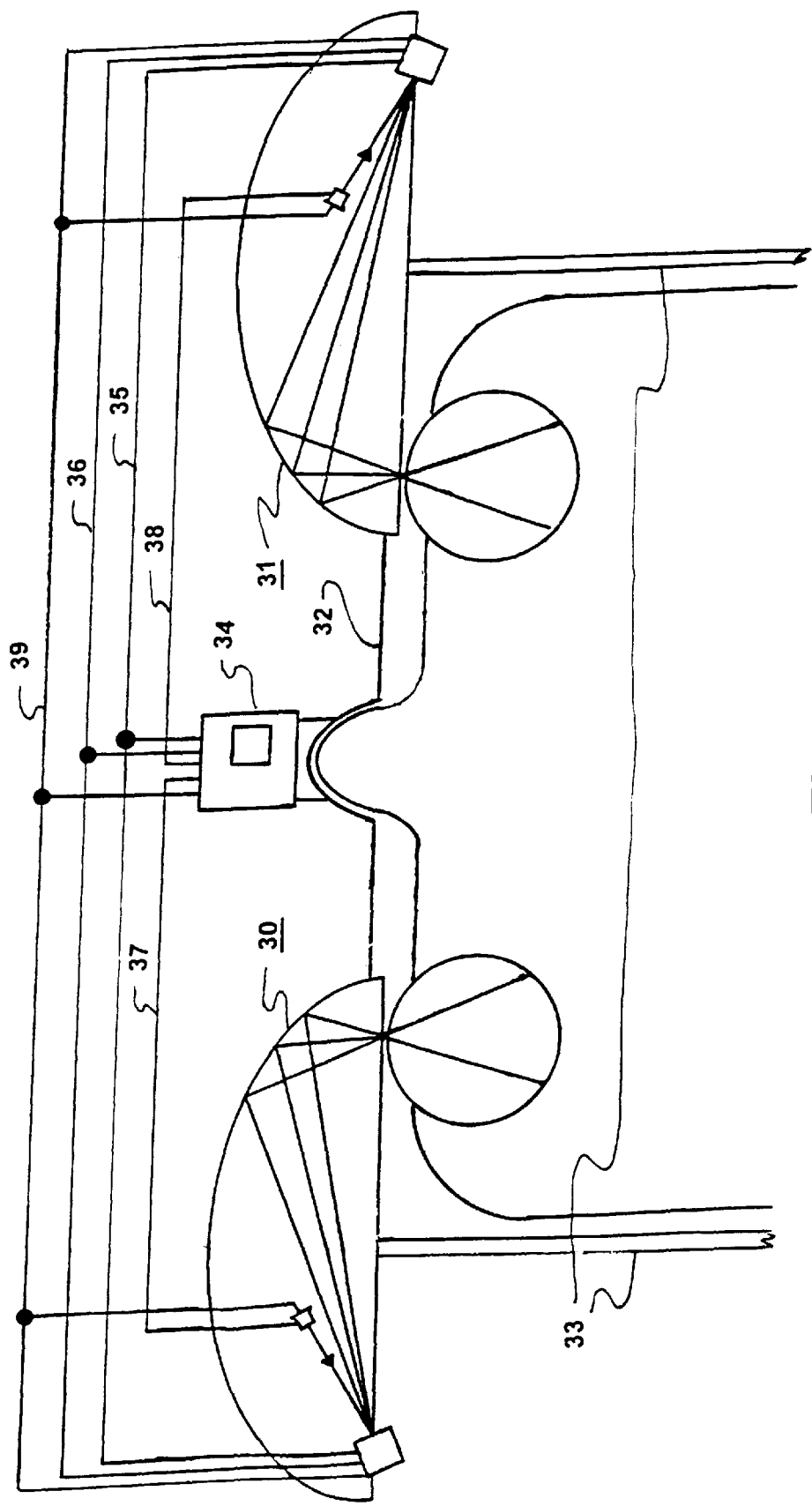
FIG. 2 shows two halves of the shell from FIG. 1, each with identical optical components, mounted on a head frame for stereo viewing.

FIG. 2 shows a head-mounted stereo arrangement of viewers 30 and 31, according to FIG. 1 The shell portions can conveniently may come from the same shell. The shell portions are interconnected by frame members such as a nose piece 32 and ear pieces 33, preferably adjustable in length, so as to form an eyeglass-like structure. The secondary normal in each viewer is aligned with the optical axis of a different one of the user's eyes by adjusting the length of the nose piece. The viewers can use the same modulation signal source to provide redundancy or different sources to achieve three dimensional or other effects. Standard connectors for d.c. power and video signals may be added to the frame as a module 34 shown mounted on the nose piece or on the ear pieces. These are then wired to the electrodes on the shell portions by buss arrangements like x,y pulse busses 35 and 36, amplitude modulation busses 37 and 38, and a common return buss 39; all of which can be printed on the nose or ear pieces and along the unused edges of the shell portions. Additional busses can be added to accommodate color electrodes which will be discussed presently.

Figure 3A:
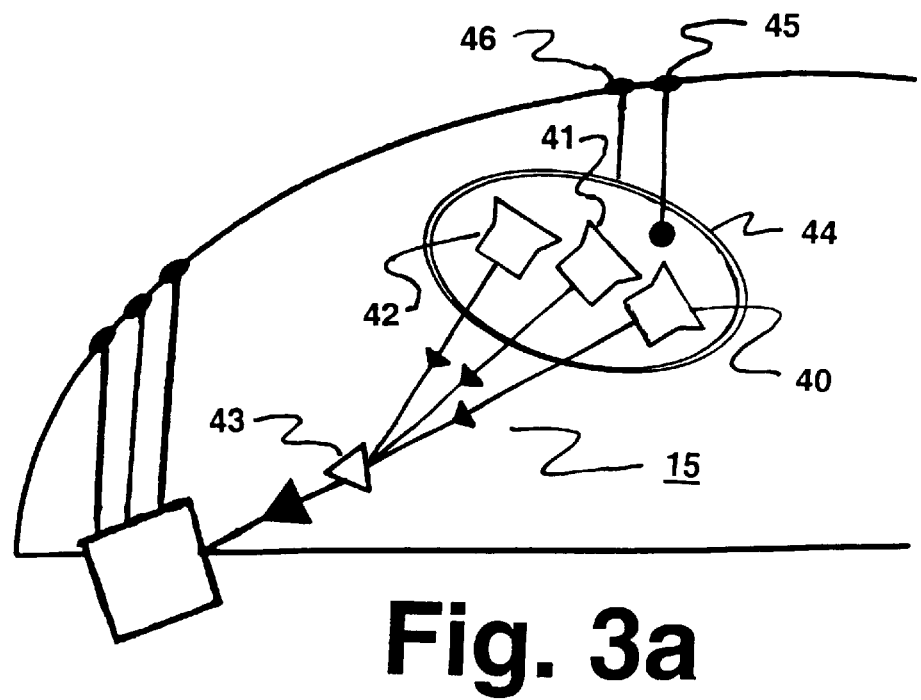
FIG. 3a shows a second laser device for creating black and white images.

As shown in FIG. 3*a*, If a true black and white image is desired a white laser device can be fabricated. This laser device 15 may include a number of colored light lasers 40, 41 and 42 with their beams directed toward a first broad face of a beam combiner such as a wedge shaped prism 43, or an equivalent diffraction grating. For example, imagine a white beam striking the opposite broad face and emerging from the first face as separate colored reference beams. Each of these lasers is placed to form the reference beam of its respective color and to preserve the same relative cross-section and intensity between beams. For example, the lasers may be red, green and blue and may all be driven by the same amplitude-modulated pump 44. The pump input is connected to a signal electrode 45 and a common return electrode 46 on the outside of the shell. The resultant white beam 47 emerging from the opposite face has the same cross-section as the colored beam, i.e. a pixel of an image that is approximately the size of the human retina.

Figure 3B:
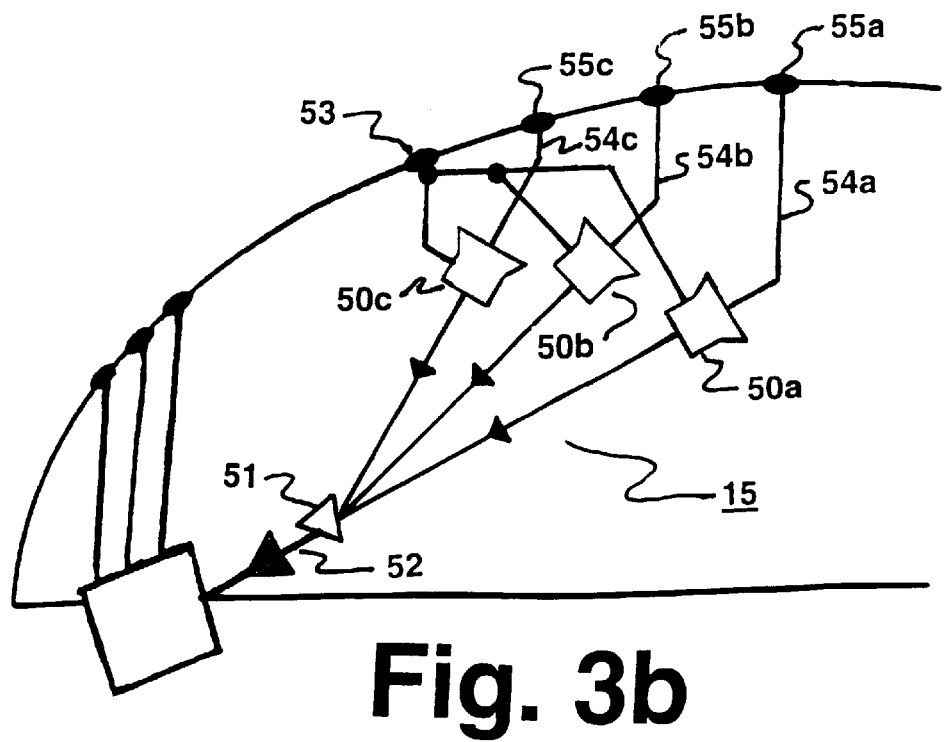
FIG. 3b shows a third laser device for creating full color images.

Further, As shown in FIG. 3*b*, the laser device 15 may be used to produce multi-colored images by including a plurality of lasers 50*a*, 50*b* and 50*c* of different colors each pumped by a separate intensity modulated signal relevant to its color. Preferably the three lasers may represent the three primary light colors, indicated above, which are detected by the human eye. The lasers provide beams with cross-sections equal to that of the main beam. As indicated above these may be directed to the same point on one face of a wedge-shaped prism 51 or a diffraction grating and they will emerge as one main beam 52. Each laser has an amplitude modulation input 54*a*, 54*b* or 54*c* connected to an electrode 55*a*, 55*b* or 55*c* on the shell portion and all may share a common return electrode 53 with the scan pulses. Signal sources are available in the TV art that supply such modulation signals in response to a standard color video signal for three gun color picture tubes.

Figure 3C:
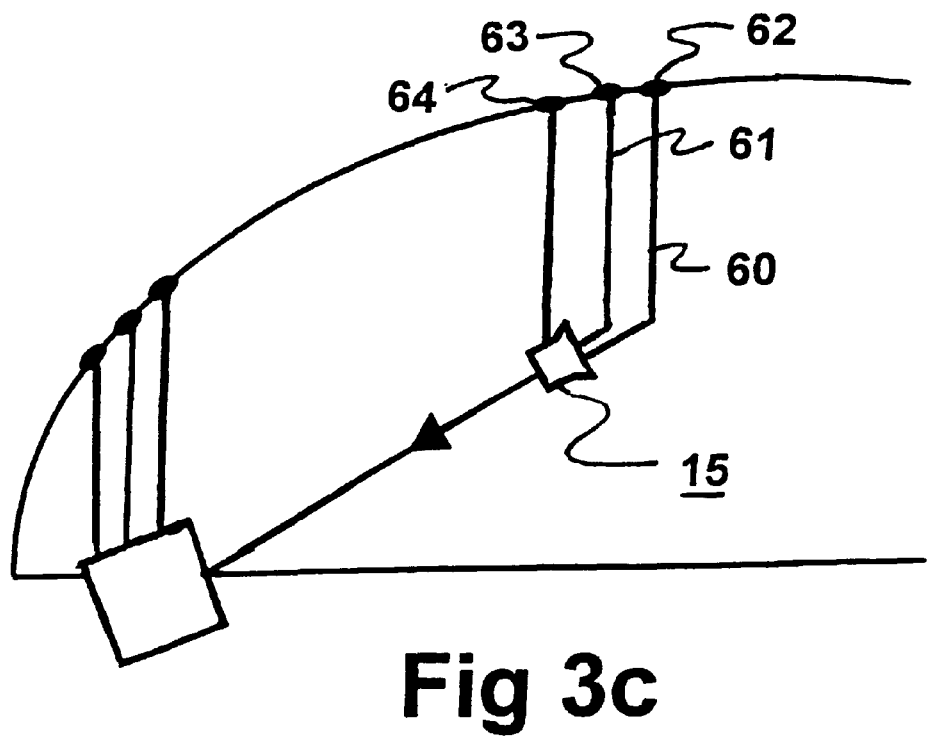
FIG. 3c shows a fourth laser device for creating full color images.

As shown in FIG. 3*c*, laser device 15, may be formed using a single laser designed so that the color of the beam is modulated as well as its amplitude. This device thus requires only two signal inputs 60 and 61. The first input 60 requires a color signal source similar to that used in most color TV systems where a single stream of electrons is shifted between phosphor color dots or lines on the screen by phase changes in a color burst signal. The second input 61 requires only the amplitude of the video. As before these signals are transmitted through electrodes 62 and 63 on the shell portion. These signals may share a common return electrode 64. The common return electrodes described above may also be shared with the drive signals for the scan mirror motor, if desired.

Figure 3D:
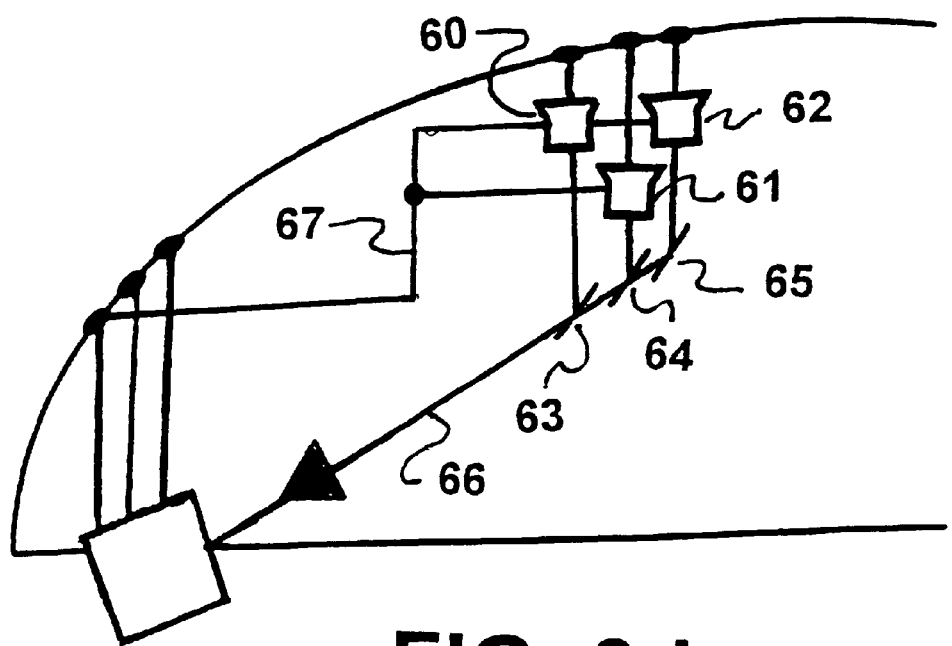
FIG. 3d shows a fifth laser device for creating full color images.

Finally as shown in FIG. 3*d* the three laser device of FIG. 3*a* or FIG. 3*b* may employ a three mirror combiner. The three lasers 60, 61 and 62 can be placed so that their color beams are substantially parallel in the reference plane, at any convenient spacing and at any convenient angle to the major axis. Three small mirrors 63, 64 and 65 are centered on each of the color beams, respectively. These mirrors are formed by tuned transparent layers, i.e. multiple quarter wavelength thicknesses, etc., so that they reflect only the one laser color and pass any other. The mirrors are also centered on the desired path of the main beam 66 and are tilted to reflect the color beams into the main beam. As before each laser has its own input electrode and they share a common return buss 67.

As indicated above red diode lasers are available that fit nicely into the goggle configuration of FIG. 1 or 2. Green and blue lasers tend to be larger. There is, however, no constraint on the size of the shells, except in the case of a goggle system. There are, however, visible liquid dye lasers with lasing material less than 2 cm long. The small power needed allows the use of compact light pumps. Gas and solid state lasers using diode pumps are also available in TV primary colors in compact configurations. The lasers can also be placed on the outside the shells, which are preferably transparent except for the mirrored area near the raster point. Fiber optics can also be used to conduct the laser beams from remote lasers to the prism or diffraction grating, if desired.

Specific numerical values were chosen for the geometry FIG. 1 to illustrate the interesting property of angular magnification in the elliptical cavity. As shown in the figure, the foci of the ellipse are located a distance c away from the geometric center and along the major axis as determined by the formula $a^2-b^2=c^2$, where a and b are the half-lengths of the major and minor axes. The term "eccentricity," denoted by the variable e, is often used to describe how close to circular the ellipse may be, and is defined as e=c/a. As e approaches zero, the ellipse rounds out to become more like a true circle. It is useful to note that as e approaches zero, the angular ray fans from both foci become more equal, whereas if e approaches a value of unity, the scan angle becomes significantly smaller than the field of view angle. This is useful to allow miniature scanning devices with limited angles of travel to provide a relatively large field of view to the eye. In FIG. 1, a condition of roughly 4X angular magnification is achieved. FIG. 1 shows proper angular proportions, and these may be scaled to any desired units of linear dimension. The "eye relief" parameter is loosely estimated to be the distance from the eye pupil location to the nearest interference with either a cavity mirror segment or a passage of ray fan bundles. As shown, the system in FIG. 1 could provide a 40 degree field angle to the eye pupil with only a 10 degree maximum scan angle required. If the scale of linear dimension is chosen as millimeters, the system also provides roughly 25 mm of eye relief, and the scan device must be placed about 170 mm away from the eye pupil (no fold mirrors are shown). Differing values of eccentricity "e" will allow the technique to be applied to other angular magnifications and fields of view, and then linear scale factors must be evaluated to provide a desired minimum eye relief distances.

It is interesting to note that best imagery will be attained only for relatively small laser beam ray diameters much less than the typical 5–7 mm diameter exit pupil of a conventional eyepiece, such that the elliptical curvature does not create a rapidly converging focus for each ray. This is somewhat counterintuitive to a conventional eyepiece approach, wherein it is desired to entirely fill the eye pupil with a collimated beam for each increment in the field of view. By completely filling the eye pupil, a maximum of energy from a conventional display source is achieved. In the case of retinal imaging, it is possible to take advantage of the extreme brightness and narrow directionality of laser sources to allow adequate imagery in an underfilled eye pupil. The diameter of the scanned laser beams may then be determined solely by geometric focusing requirements to allow comfortable viewing, and it is this fact which offers an extraordinary benefit to the design of a light weight optical delivery system. If laser beam shaping is required to achieve the infinity focus, then it is possible to provide the beam correction near the scanning device. The center of the field of view is best chosen as the position of the central ray in the collimated bundle, and the placement of the mirror segment should be such that this ray enters the eye along the observer's natural central line of sight. Image distortions across the field of view can be compensated by either a non-linear scanning or by variable clocking of the laser intensity modulation.

Although circular symmetry in both horizontal and vertical scan directions may be assumed, it need not be a restriction. If a horizontal to vertical aspect ratio of, for example, 4:3 is required, and if the scanning devices are capable of wider excursions, it is possible to extend only the horizontal dimensions to achieve the desired result. Instead of a circular collimated beam between the two mirrors, the wider horizontal field would require a more elliptical beam cross-section. In the example of FIG. 1, it is possible to provide a field of view of 40 degrees vertical by 53.3 degrees horizontal using this technique.

While this invention has been described in terms of preferred embodiment consisting of a pair of shell portions, those skilled in the art will recognize that the invention can be practiced with modification within the spirit and scope of the appended claims.

Having described my invention, I claim:

1. An optical viewer for use with at least one source of d.c. power, at least one video signal and pulse synchronization signals in TV type format; said viewer including:
    a portion of a first shell with an inside surface generated by rotating an ellipse about its major axis, the ellipse having a primary and a secondary focal point on said axis and a reference plane that includes said axis, as well as primary and secondary normals to said axis extending from said respective focal points to said shell;
    a separate input and a common return electrode mounted on said shell for at least one d.c. power supply and each analog, horizontal pulse and vertical pulse signal present in said video signals;
    a modulated laser means mounted on said shell and connected to said electrodes to project a narrow main visible laser beam, centered in said reference plane between said normals, to said primary focal point;
    a plane reflector substantially centered on said primary point oriented to reflect said main beam to the raster intersection of said secondary normal and inner surface of said shell;
    an x-y scan motor, connected to said pulse signal electrodes, mounted between said shell and said reflector to angularly deflect said main beam in response to said horizontal and vertical pulse signals, whereby said scanned main beam defines an illuminated raster area around said raster intersection; and
    an elliptical mirror coated over said raster area to focus said scanned beam at said secondary focal point.

2. An optical viewer according to claim 1, wherein:
    only a single modulation electrode is provided for a black and white analog video signal; and
    said laser means comprises a single laser emitting an amplitude modulated monochromatic beam connected between said d.c., single and common return electrodes.

3. An optical viewer according to claim 1, wherein:
    only a single modulation electrode is provided for a black and white analog video signal; and
    said laser device includes a beam combiner into which are directed three lasers each emitting a different primary color light beam and connected between said modulation and common return electrodes; whereby said primary beams form a white main beam.

4. An optical viewer according to claim 1, wherein:
    three modulation electrodes are provided for three different analog video primary color signals; and
    said laser device includes a beam combiner into which are directed three lasers each emitting a different primary color light beam and connected between a common return and a different one of said modulation electrodes; whereby said primary beams form a color modulated main beam.

5. An optical viewer according to claim 1, wherein:
    a first color electrode is provided for a color amplitude analog signal;
    a second color electrode is provided for a color hue analog signal; and
    said laser means comprises a single laser including amplitude modulating means and color modulating means with each modulating means connected between a respective one of said color electrodes and a common return.

6. An optical viewer according to claim 1, further including:
    a head-mounted frame attached to said shell and positioned such that the optical axis in one eye of a wearer is optically aligned with said secondary normal.

7. An optical viewer according to claim 6, further including:
    a second shell portion identical to said first portion with similar optical elements thereon attached to said frame such that the optical axis in the other eye of said wearer is optically aligned with said secondary normal of said second shell.

8. An optical viewer according to claim 2, further including:
    a head-mounted frame attached to said shell and positioned such that the optical axis in one eye of a wearer is optically aligned with said secondary normal.

9. An optical viewer according to claim 3, further including:
    a head-mounted frame attached to said shell and positioned such that the optical axis in one eye of a wearer is optically aligned with said secondary normal.

10. An optical viewer according to claim 4, further including:

a head-mounted frame attached to said shell and positioned such that the optical axis in one eye of a wearer is optically aligned with said secondary normal.

11. An optical viewer according to claim 5, further including:

a head-mounted frame attached to said shell and positioned such that the optical axis in one eye of a wearer is optically aligned with said secondary normal.

12. An optical viewer according to claim 8, further including:

a second shell portion identical to said first portion with similar optical elements thereon attached to said frame such that the optical axis in the other eye of said wearer is optically aligned with said secondary normal of said second shell.

13. An optical viewer according to claim 9, further including:

a second shell portion identical to said first portion with similar optical elements thereon attached to said frame such that the optical axis in the other eye of said wearer is optically aligned with said secondary normal of said second shell.

14. An optical viewer according to claim 10, further including:

a second shell portion identical to said first portion with similar optical elements thereon attached to said frame such that the optical axis in the other eye of said wearer is optically aligned with said secondary normal of said second shell.

15. An optical viewer according to claim 11, further including:

a second shell portion identical to said first portion with similar optical elements thereon thereto attached to said frame such that the optical axis in the other eye of said wearer is optically aligned with said secondary normal of said second shell.

16. An optical viewer according to claim 4, wherein:

the beams of said lasers intersect said main beam at three spaced points; and said combiner is a series of tuned narrow band flat thin film filters, each centered on the axis of said main beam at one of said points, each filter thereby reflecting the beam of a different laser into said main beam before it reaches said primary focal point, at least two of said filters being transparent to at least one of the beams from the remaining lasers.

17. An optical viewer according to claim 4, wherein:

said combiner is a prism centered on the axis of said main beam refracting the beams from all of said lasers into said main beam before it reaches said primary focal point.

18. An optical viewer according to claim 4, wherein:

said combiner is a diffraction grating centered on the axis of said main beam reflecting the beams from all of said lasers into said main beam before it reaches said primary focal point.

19. An optical viewer according to claim 1, wherein:

said shell portion is transparent to visible frequencies of light and said elliptical mirror is also transparent to visible frequencies of light except those emitted by said modulated laser means.

20. An optical viewer according to claim 4, wherein:

said shell portion is transparent to visible frequencies of light and said elliptical mirror is also transparent to visible frequencies of light except those emitted by said modulated laser means.

* * * * *